No. 693,595. Patented Feb. 18, 1902.
J. L. FRAZIER.
COUPLING.
(Application filed July 13, 1900. Renewed Jan. 2, 1902.)
(No Model.)
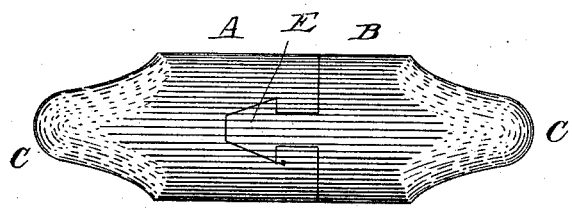
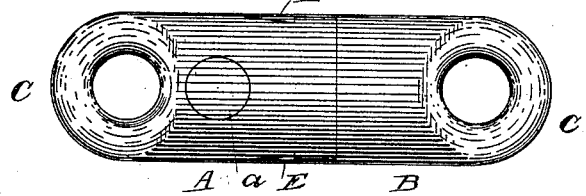
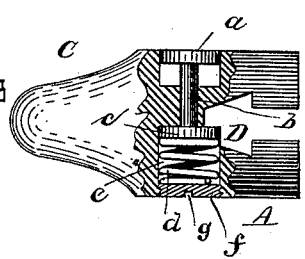
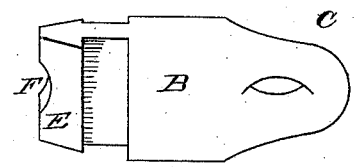
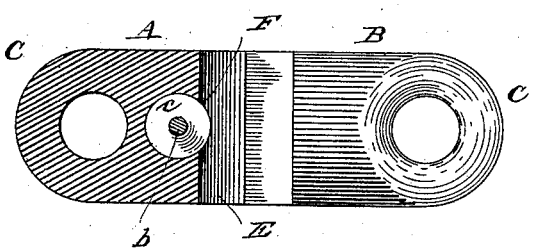
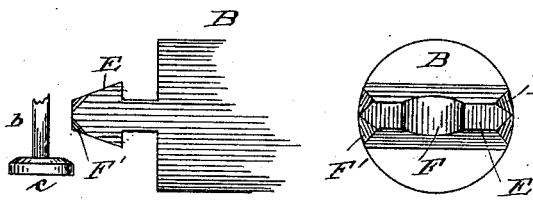
WITNESSES
INVENTOR
James L. Frazier.
By L. M. Thurlow
Atty.

UNITED STATES PATENT OFFICE.

JAMES L. FRAZIER, OF PEORIA, ILLINOIS.

COUPLING.

SPECIFICATION forming part of Letters Patent No. 693,595, dated February 18, 1902.

Application filed July 13, 1900. Renewed January 2, 1902. Serial No. 88,030. (No model.)

*To all whom it may concern:*

Be it known that I, JAMES L. FRAZIER, a citizen of the United States, residing at Peoria, in the county of Peoria and State of Illinois, have invented certain new and useful Improvements in Rope or Cable Couplings; and I do hereby declare that the following is a full, clear, and exact description of the invention, which will enable others skilled in the art to which it appertains to make and use the same.

This invention pertains to couplers, and more particularly to that class used for making connection between wire ropes or cables, for making coupling between mining-cars, and for bell-ropes in train service. It is also applicable to buggies and other vehicles, as a thill-coupling for traces on harness, for hammocks, and as a coupling for shafting. However, though I may use the coupling for these purposes, I desire to state that for rope service of all kinds I attach the greatest importance to the device. It is invaluable for use on ships' hawsers, for hoisting and shipping, or for hoisting buckets in mines where vertical shafts are used, and all kindred work.

The object of the invention is to provide a simple but effective coupler for the purposes named and one that will not become separated under any circumstances while in actual use.

In the drawings herewith presented, Figure 1 is a side view of my improved coupler. Fig. 2 is a top view thereof. Fig. 3 is a side view of a portion of the device, showing a spring-catch therein for locking purposes. Fig. 4 is a perspective view of a second portion adapted to engage with that shown in Fig. 3. Fig. 5 is a top view of the coupler, showing one portion in cross-section to show the locking arrangement. Fig. 6 is a detail view of part of a catch. Fig. 7 is a side view of a tongue which engages with said catch. Fig. 8 is an end view of the latter.

In the figures, A and B represent two body portions of the coupler, each having at its outer end an eye C for cable or other connection. The portion A is provided with a dovetailed groove D, cut transversely through it, and the portion B carries a tongue L of a corresponding shape, adapted to enter said groove and fit snugly therein though arranged to be freely withdrawn. The body of the coupler is preferably round in cross-section, and the edges of the tongue are flush with the rounded surface, thus presenting a neat appearance and giving a smooth periphery to move over or through pulleys or small openings.

In Figs. 3 and 4 I show the means of locking the body portions together. This consists of a plunger or catch seated in the coupling at right angles to the length of the said coupling to move in the direction of its length to engage a notch F in the tongue E. The plunger embodies a finger-piece $a$, attached to a stem $b$, and secured to the inner end of the latter is a disk $c$, upheld normally by a spring $d$, inclosed in a recess $e$. Said recess is closed by a threaded plug $f$, upon which the said spring is seated. The body portion A is bored for the stem $b$ and counterbored to permit the depression of the finger-piece or button $a$. The relation of the parts is such that when the upper surface of the button $a$ is flush with the periphery of the body the disk $c$ is within the groove D, which the bore $e$ intersects. The catch being located midway the thickness of the body A, and the notch F in the tongue being made to correspond, it will be evident that when the button $a$ is depressed by the finger and the tongue slipped to its place said catch will engage the notch and hold the parts firmly against movement. The device is made so that the parts cannot be locked together without depressing the button $a$ to permit entrance of the tongue; but, as shown in Figs. 6, 7, and 8, the disk $c$ may be beveled and the corners of the tongue at F' likewise beveled in order to permit the tongue to slip into place by the bevels contacting to push the said disk down instead of using the finger to accomplish that end. When in proper register, the disk will rise within the notch F by reason of the spring, as is evident. Either the button $a$ or the disk $c$ must be removably attached to the stem $b$ in order to permit the entrance of the said stem into its bore when assembling the parts. The plug $f$ is provided with a slot $g$ for receiving the bit of a screw-driver; but any other means of securing said plug in place other than by screw-threads may be employed. In fact, I do not confine myself to any particular construction as to any part of my improved coupler. My idea is to provide a device of this nature that can be quickly adjusted and when so adjusted will not become separated while in use, and, furthermore, a device that will have a smooth body, so that there will be no hindrance to the easy passage thereof through a small opening.

While I have mentioned the uses to which my coupling may be put, I do not confine myself to those uses alone, as there are many others to which it can be equally well adapted.

I claim—

1. A coupling of the character described composed of two portions, one having a dovetailed groove, the other a tongue to correspond therewith and engage such groove, locking means in the side of the portion having the dovetailed groove, the same being arranged at right angles to the tongue and adapted to lock with the same by means of a groove in the end of said tongue whereby the two portions are prevented from separating, as set forth.

2. A coupling of the character described comprising two portions, one having a groove, the other a tongue to engage said groove, and a spring-actuated locking means in the grooved portion at right angles to the tongue, the same being adapted to engage the latter when the two body portions are interlocked and adapted when pressure or a direct thrust is applied thereto against its spring to release the tongue whereby the body portion may be separated substantially as set forth.

3. A coupling for the purpose herein described, consisting of two portions, one having a groove cut entirely through it, at one end, a tongue at one end of the other portion adapted to enter said groove from either side and arranged to prevent separation when under stress or strain longitudinally, and locking means for engaging the tongue to prevent movement thereof, in either direction laterally within said groove substantially as set forth and described.

4. A coupler of the character described consisting of two portions, one having a groove, the other a tongue to engage said groove, a notch in the tongue, and a catch in the side of the grooved portion at right angles to the tongue for engaging the notch substantially as set forth and for the purpose described.

5. A coupler for the purposes set forth arranged for attachment to cables, consisting of two body portions, one having a groove, the other a tongue corresponding in form with that of the said groove and adapted to engage with such groove, a spring-catch in the body portion having the groove and a notch in the tongue adapted to be engaged by said catch substantially as set forth and for the purposes described.

6. A coupler for the purposes described arranged for attachment to cables and the like, consisting of two body portions, one having a groove therein, the other a tongue or projection to engage with such groove, a notch in the tongue, a catch consisting of a finger-piece having a stem, a disk on the opposite end of the stem the same adapted to engage with the said notch in the tongue and a spring for normally keeping the disk in engagement with the notch all substantially as set forth and described.

7. A coupling for the purposes set forth consisting of two body portions A and B, an eye C in the outer end of each, a dovetailed groove D in the portion A, a tongue E on the portion B for engaging such groove, a notch F in said tongue, a catch in the said portion A adapted to move at right angles to the said tongue and groove, which consists of a stem $b$ having a button $a$ and a disk $c$ at its outer and inner ends respectively, the latter to enter the groove D and engage the notch F of the tongue E when the latter is seated in the groove and a spring for keeping the said catch normally raised within the said groove D as set forth and for the purposes described.

In testimony whereof I affix my signature in presence of two witnesses.

JAMES L. FRAZIER.

Witnesses:
C. JOHNSON,
ARTHUR KEITHLEY.